US012577107B2

(12) United States Patent
Kawai et al.

(10) Patent No.: US 12,577,107 B2
(45) Date of Patent: Mar. 17, 2026

(54) SILICON NITRIDE POWDER FOR SINTERING

(71) Applicant: TOKUYAMA CORPORATION, Shunan (JP)

(72) Inventors: Hideaki Kawai, Shunan (JP); Satoru Wakamatsu, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 708 days.

(21) Appl. No.: 17/918,758

(22) PCT Filed: Apr. 9, 2021

(86) PCT No.: PCT/JP2021/015033

§ 371 (c)(1),
(2) Date: Oct. 13, 2022

(87) PCT Pub. No.: WO2021/210507

PCT Pub. Date: Oct. 21, 2021

(65) Prior Publication Data

US 2023/0140491 A1     May 4, 2023

(30) Foreign Application Priority Data

Apr. 13, 2020     (JP) ................................. 2020-071581

(51) Int. Cl.
| | |
|---|---|
| *C09C 1/28* | (2006.01) |
| *C01B 21/068* | (2006.01) |
| *C04B 35/584* | (2006.01) |
| *C04B 35/587* | (2006.01) |
| *C09C 3/00* | (2006.01) |
| *C09C 3/04* | (2006.01) |
| *C09C 3/12* | (2006.01) |

(52) U.S. Cl.
CPC ............ *C01B 21/0687* (2013.01); *C09C 1/28* (2013.01); *C09C 3/006* (2013.01); *C09C 3/041* (2013.01); *C09C 3/12* (2013.01); *C01P 2006/12* (2013.01); *C01P 2006/32* (2013.01); *C01P 2006/80* (2013.01)

(58) Field of Classification Search
CPC ..... C01B 21/0687; C01B 21/068; C09C 1/28; C09C 3/006; C09C 3/041; C09C 3/12; C01P 2006/12; C01P 2006/32; C01P 2006/80; C04B 35/6265; C04B 35/6261; C04B 35/6263; C04B 2235/3206; C04B 2235/3225; C04B 2235/3882; C04B 2235/3895; C04B 2235/483; C04B 2235/5409; C04B 2235/5436; C04B 2235/5445; C04B 2235/6567; C04B 2235/77; C04B 2235/9607; C04B 35/584; C04B 35/587
USPC ......................................................... 423/344
See application file for complete search history.

(56) References Cited

U.S. PATENT DOCUMENTS

| | | | | |
|---|---|---|---|---|
| 5,478,784 | A | * 12/1995 | Shibata | ............... C01B 21/0687 |
| | | | | 501/97.1 |
| 9,085,462 | B2 * | 7/2015 | Shibata | .................. C01B 21/068 |
| 10,399,854 | B2 * | 9/2019 | Yamao | .................. C01B 21/068 |
| 2020/0399125 | A1 | 12/2020 | Wakamatsu | |

FOREIGN PATENT DOCUMENTS

| | | |
|---|---|---|
| CN | 103173098 A | 6/2013 |
| CN | 104387085 A | 3/2015 |
| CN | 110357643 A | 10/2019 |
| JP | 62-824162 A | 4/1987 |
| JP | 7-81908 A | 3/1995 |
| JP | 8-183606 A | 7/1996 |
| JP | 2000-159512 A | 6/2000 |
| JP | 2000-238023 A | 9/2000 |
| JP | 2006-162907 A | 6/2006 |
| JP | 2011-51856 A | 3/2011 |
| WO | WO 2019/167879 A1 | 9/2019 |

OTHER PUBLICATIONS

Extended European Search Report for corresponding European Application No. 21788357.8, dated Sep. 3, 2024.
International Search Report for PCT/JP2021/015033 mailed on Jun. 22, 2021.

* cited by examiner

*Primary Examiner* — Cam N. Nguyen
(74) *Attorney, Agent, or Firm* — Birch, Stewart, Kolasch & Birch, LLP

(57)     ABSTRACT

A silicon nitride powder for sintering which, despite of its fine powdery form, shows a very small increase in the oxygen concentration with time and features excellent storage stability. The silicon nitride powder for sintering has a specific surface area of 5 to 30 $m^2/g$, and is characterized by having a hydrophobicity (M value) of 30 or more and an increase in the oxygen concentration of 0.30% by mass or less after left to stand in the air of a humidity of 90% and 20° C. for 48 hours. The silicon nitride powder for sintering can be obtained by dry-pulverizing aggregated masses of the silicon nitride in an inert atmosphere in the presence of a silane coupling agent.

4 Claims, No Drawings

SILICON NITRIDE POWDER FOR SINTERING

TECHNICAL FIELD

This invention relates to a novel silicon nitride powder for sintering. More specifically, the invention provides a silicon nitride powder for sintering which, despite of its fine powdery form, shows a very small increase in the oxygen concentration with time and features excellent storage stability.

BACKGROUND ART

Among various kinds of ceramic sintered bodies, a silicon nitride sintered body obtained by adding various kinds of sintering assistants to a silicon nitride powder followed by sintering at a high temperature, shows such features that it is light in weight, has a large mechanical strength, is highly resistant against the chemicals, has a high electric insulation, etc., and has hence been used as an abrasion resistant material like ball bearings, temperature resistant structural material and the like. Upon selecting the kinds of assistants and sintering conditions, furthermore, it is also allowable to improve its heat conductivity. At present, therefore, the silicon nitride sintered body is also finding its use as a substrate material for radiating the heat featuring small thickness and large strength.

Generally known methods of synthetizing the silicon nitride powder include an imide thermal decomposition method in which a silicon tetrachloride is reacted with an ammonia to form an intermediate product of imide which is then thermally decomposed to obtain a silicon nitride powder (patent document 1) and a direct nitriding method in which a solid silicon is subjected to the nitriding treatment to form aggregated masses thereof which are then pulverized to obtain a silicon nitride powder (patent document 2).

The silicon nitride powder synthesized by the above imide thermal decomposition method is a powder having a relatively uniform grain size or a mean grain size of about 1 µm. In other words, this is an α-type silicon nitride powder having a high α conversion ratio. On the other hand, the silicon nitride powder synthesized by the direct nitriding method is, usually, obtained as aggregated masses of a β-type silicon nitride having a high β conversion ratio. Therefore, the aggregated masses are pulverized into the form of a powder of a mean grain size of about 1 µm.

When it is attempted to produce a sintered body of the silicon nitride powder, it is a generally accepted practice to use the silicon nitride powder of grain sizes of submicrons so that the powder can be sintered easily. However, the silicon nitride powder in the state of fine powder involves such a problem that the powder itself has a large specific surface area and its surfaces are subject to be easily oxidized at temperatures and humidities of an environment in which it is stored. When this silicon nitride powder is used for the production of the sintered body, the oxygen concentration in the silicon nitride powder undergoes a change depending on the period of storage causing, therefore, properties of the silicon nitride sintered body that is obtained to lose stability. Specifically, the silicon nitride powder has highly active surfaces when it is obtained through the step of pulverizing the aggregated masses of silicon nitride into a fine powder thereof as in the case of the above-mentioned direct nitriding method. In this case, it has been confirmed that the oxygen concentration varies to a large degree in the silicon nitride powder.

On the other hand, there has also been employed a traditional way of processing the silicon nitride powder depending on the objects.

For example, patent documents 3 and 4 are disclosing how to hydrophobize the surfaces of the silicon nitride powder when it is to be used as a toner or a filler.

A patent document 5 discloses a method of treating the silicon nitride powder by using a surfactant in the production of a green sheet by improving affinity of the silicon nitride powder with a slurry component so as to reduce fluidity and irregularity in the thickness.

Moreover, a patent document 6 discloses a pulverization assistant that prevents an increase in the oxygen concentration during the pulverization in an attempt to inexpensively produce a silicon nitride powder that has a low oxygen content and a high specific surface area.

However, these treating operations are for the uses different from that of the above-mentioned silicon nitride powder for sintering. Even if the uses might be in agreement, their treating operations do not at all help solve the problems mentioned above.

PRIOR ART DOCUMENTS

Patent Documents

Patent document 1: JP-A-2000-159512
Patent document 2: JP-A-2011-51856
Patent document 3: JP-A-62-84162
Patent document 4: JP-A-2006-162907
Patent document 5: JP-A-2000-238023
Patent document 6: JP-A-07-081908

Outline of the Invention

Problems that the Invention is to Solve

It is, therefore, an object of the present invention to provide a silicon nitride powder for sintering which, despite of its fine powdery form, shows a very small increase in the oxygen concentration with time during the handling such as storage and features excellent storage stability.

Means for Solving the Problems

The present inventors have learned through their keen study that the fine powdery silicon nitride can be prevented to some extent from being oxidized on the surfaces when the silicon nitride powder is hydrophobized. When it was attempted to hydrophobize the fine powdery silicon nitride powder having a large specific surface area, however, the particles constituting the powder tended to be aggregated permitting the surfaces of the aggregate to become hydrophobic. When the aggregate after having been treated was pulverized, therefore, it was learned that the untreated surfaces were exposed and the desired effect was not accomplished toa sufficient degree. The inventors, therefore, have further pushed forward the study and, as a result, have discovered that upon making present a specific hydrophobizing agent at the time of pulverizing coarse particles of silicon nitride into fine powder thereof, the surfaces of the particles constituting the fine powder were reliably hydrophobized and, hence, a change in the oxygen concentration with time was very suppressed at the time of handling. It was thus discovered to obtain a silicon nitride powder from which a sintered body can be produced maintaining stability, and the invention was completed.

That is, according to the present invention, there is provided a silicon nitride powder for sintering having a specific surface area of 5 to 30 m²/g, and characterized by having a hydrophobicity (M value) of 30 or more and showing an increase in the oxygen concentration of 0.30% by mass or less after left to stand in the air of a humidity of 90% and 20° C. for 48 hours.

In the present invention, the hydrophobicity (M value) is measured by a methanol titration method.

Further, the oxygen concentrations before and after left to stand in the air of a humidity of 90% and 20° C. for 48 hours are measured by an inert gas fusion non-dispersive infrared absorption method.

Moreover, the oxygen concentration stands for a total oxygen concentration which is the sum of a surface oxygen concentration and an internal oxygen concentration.

In the silicon nitride powder for sintering of the present invention, it is desired that the oxygen concentration ($C_o$% by mass) after left to stand in the air of a humidity of 90% and 20° C. for 48 hours lies in a range represented by the following formula (1), $$C_o \leq 0.1 \times S - 0.3 \tag{1}$$

for the above-mentioned specific surface area (S m²/g).

It is, further, desired that the silicon nitride powder for sintering of the present invention has a β conversion ratio of 80% or more and an aluminum concentration of 0.1% by mass or less.

Moreover, it is desired that the silicon nitride powder for sintering of the present invention is a pulverized product and, besides, has a silane coupling agent on the surfaces thereof.

The silicon nitride powder for sintering of the present invention can be obtained by dry-pulverizing aggregated masses of the silicon nitride in an inert atmosphere in the presence of a silane coupling agent.

In the above-mentioned method, it is desired that the dry-pulverization is carried out to ensure that the pulverized product that is obtained has a specific surface area of 5 to 30 m²/g and a hydrophobicity (M value) of 30 or more.

It is, further, desired to use the aggregated masses of the silicon nitride that has an oxygen concentration of 0.5% by mass or less.

In the above-mentioned method, furthermore, it is specifically effective and desired to use a hexamethyldisilazane (HMDS) as the silane coupling agent.

Moreover, in the above method, the dry pulverization is better carried out by using a ball mill to further improve the effect of the present invention.

The present invention encompasses a method of producing a sintered body that includes the step of sintering the silicon nitride powder for sintering. The sintered body has a heat conductivity of, desirably, 80 W/mK or more. The sintered body has a relative density of, desirably, 98.5% or more.

Effects of the Invention

The silicon nitride powder for sintering of the present invention shows a change in the oxygen concentration that is suppressed to be very small with the passage of time during the handling. At the time of producing a sintered body thereof, therefore, the oxygen concentration undergoes a change very little irrespectively of the length of period of from the production of the silicon nitride powder until it is used, minimizing properties under the effect of the oxygen concentration, e.g., minimizing a change in the heat conductivity of the sintered body. The present invention, therefore, makes it possible to produce the silicon nitride powder for sintering maintaining stability.

The mechanism that shows such an excellent stability presumably stems from that the surfaces of the silicon nitride are hydrophobized by a mechanism different from the conventional treatment with the silane coupling agent. Therefore, the moisture in the air is prevented from coming in contact with the surfaces of the silicon nitride accounting for a suppressed progress of oxidation. That is, in the present invention, the aggregated masses of the silicon nitride are dry-pulverized in an inert atmosphere in the presence of a silane coupling agent. Upon employing this characteristic production method of the present invention, it is presumed that the surfaces newly formed by pulverization are readily treated with the silane coupling agent and are reliably hydrophobized and, at the same time, energy at the time of pulverization brings some action for the treatment making it possible to exhibit excellent moisture-proof property maintaining stability. The effect is different from that of a simple treatment of a fine silicon nitride powder with a silane coupling agent.

According to the production method of the present invention in which a hydrophobizing agent is also made present at the time of finely pulverizing the silicon nitride, the silicon nitride is homogeneously hydrophobized inclusive of the newly formed active surfaces whereby a contact with the moisture is suppressed during the storage and the oxidation can be effectively prevented.

MODES FOR CARRYING OUT THE INVENTION

[Silicon Nitride Powder for Sintering]

According to the present invention, the silicon nitride powder for sintering has a specific surface area of 5 to 30 m²/g, and is characterized by having a hydrophobicity (M value) of 30 or more and showing an increase in the oxygen concentration of 0.3% by mass or less and, preferably, 0.2% by mass or less after left to stand in the air of a humidity of 90% and 20° C. for 48 hours.

The above specific surface area is equivalent to a mean particle diameter of about 0.5 to 2.0 μm and, preferably, about 0.7 to about 1.5 μm.

The silicon nitride powder for sintering of the present invention must have a hydrophobicity (M value) of 30 or more and, preferably, 40 or more from the standpoint of suppressing a change with time of the oxygen concentration of the silicon nitride powder. Though there is no specific upper limit, the hydrophobicity (M value) should be 70 and, particularly, 60 at the greatest from the standpoint of producing the sintered body and handling thereof during the operation for mixing other starting materials.

In the treatment that uses the surfactants disclosed in the patent document 5 or that uses the pulverization assistants disclosed in the patent document 6, the above-mentioned M value cannot be achieved and the effects of the present invention cannot be exhibited.

Though there is no specific limitation in imparting the hydrophobic property, it is desired that the hydrophobic property is imparted by the use of the silane coupling agent that is favorably employed in the method of production that will be described later.

The silicon nitride powder for sintering of the present invention is characterized by having the above-mentioned hydrophobicity (M value) as well as showing an increase in the oxygen concentration of 0.30% by mass or less and, preferably, 0.25% by mass or less after left to stand in the air of a humidity of 90% and 20° C. for 48 hours. When the increase in the oxygen concentration is lower than 0.3% by mass, the silicon nitride sintered body shows a change in the oxygen concentration from the production until the use thereof; i.e., the silicon nitride sintered body is affected for its properties such as sintered density. Therefore, it becomes difficult to obtain a sintered body that has stable quality such as stable heat conductivity and strength. Incidentally, in the case of the fine powdery silicon nitride powder having a specific surface area nearly the same as that of the above-mentioned silicon nitride powder, an increase in the oxygen concentration, in many cases, exceeds 0.5% by mass as will be described in Comparative Examples appearing later. It is, therefore, considered that the quality of the sintered bodies obtained therefrom might fluctuate to a large extent.

Here, if represented by the rate of increase based on the oxygen concentration of the silicon nitride powder of before left to stand in the air of a humidity of 90% and 20° C. for 48 hours, it is desired that an increase in the oxygen concentration is 30% or less and, preferably, 25% or less.

In the present invention, specifying the range of an increase in the oxygen concentration not only satisfies the M value of the silicon nitride powder, but also indicates that the untreated particle surface does not remain in the silicon nitride powder.

When the silicon nitride powder for sintering of the present invention is obtained by the hydrophobizing treatment that will be described later by pulverizing masses of firm aggregates formed in the direct nitriding method, the particles will be formed as an in terminate shape.

As described above, the silicon nitride powder which is the starting material for the sintered body was proposed, first, by the present invention, the silicon nitride powder being a fine powder having a specific surface area of 10 m²/g or more yet showing an increase in the oxygen concentration of 0.3% by mass or lower after left to stand in the air of a humidity of 90% and 20° C. for 48 hours.

Though there is no specific limitation on the type of crystals of the silicon nitride that constitutes the silicon nitride powder for sintering of the present invention, it is desired that the silicon nitride powder for sintering is a β-type silicon nitride powder having a β conversion of 70% or more and, particularly, 80% or more. The β-type silicon nitride can be sintered poorer than the α-type silicon nitride. From the standpoint of improving the sintering density through the sintering, therefore, it is desired that the β-type silicon nitride has a large specific surface area or, in other words, has a small particle diameter so as to be favorably adapted to the present invention.

It is, further, desired that the silicon nitride powder for sintering of the present invention has an oxygen concentration ($C_o$ % by mass) which is as small as possible after left to stand in the air of a humidity of 90% and 20° C. for 48 hours, the oxygen concentration ($C_o$ % by mass) lying in a range represented by the following formula (1), $$C_o \leq 0.1 \times S - 0.3 \qquad (1)$$

for the specific surface area ($S m^2/g$).

It is, further, desired that the silicon nitride powder for sintering of the present invention contains an aluminum element in an amount of 0.1% by mass or less in order to improve heat conductivity and the like properties of the sintered body obtained therefrom. The above-mentioned purity can be realized, for example, by employing, as a method of producing the silicon nitride, the direct nitriding method which uses a starting material of metal silicon of a high purity and does not use additives such as metal catalyst.

As described concerning the method of production appearing later, furthermore, the above $C_o$ value is achieved without positively forming an oxide layer on the surfaces of the silicon nitride powder during the hydrophobizing treatment with the silane coupling agent, which is contrary to the traditional practice.

The oxygen concentration in the silicon nitride powder for sintering starts increasing right after the production thereof and reaches the saturation. In this case, the $C_o$ value greatly exceeds the above-mentioned range. The silicon nitride powder for sintering of the present invention is the silicon nitride powder that already has a largely increased oxygen concentration right after the production prior to reaching the saturation value. It can, therefore, be said the $C_o$ value is a value obtained as a result of treating the silicon nitride powder which was in such a state.

In addition to the above aluminum element, further, the silicon nitride powder for sintering may, desirably, contain an iron element in an amount of 0.1% by mass or less and high-melting metal elements such as tungsten, molybdenum, etc. in amounts of 0.1% by mass or less, respectively.

[Method of Producing the Silicon Nitride Powder for Sintering]

Though there is no specific limitation on the method of producing the silicon nitride powder for sintering of the present invention, described below is a representative production method, i.e., a method of dry-pulverizing aggregated masses of the silicon nitride in an inert atmosphere in the presence of a silane coupling agent.

<Aggregated Masses of the Silicon Nitride>

The silicon nitride is obtained in the form of aggregated masses thereof by the method of producing the silicon nitride. For instance, the silicon nitride is produced by the direct nitriding method by reacting the silicon (silicon powder) with the nitrogen at a high temperature. In this case, the silicon nitride is obtained, in many cases, in the form of aggregated masses thereof in which the silicon nitride particles are partly sintered and firmly aggregated together. When the imide method is employed, the silicon nitride is obtained in the form of aggregated masses in which a fine powder thereof is lightly aggregated. Of them, the present invention uses the aggregated masses obtained by the direct nitriding method and in which the silicon nitride particles are firmly aggregated together. This is preferred from the standpoint of an increased effect of treatment when the silicon nitride is pulverized in the presence of the silane coupling agent that will be described later.

As the direct nitriding method, there can be preferably used a method of synthesizing the silicon nitride based on the direct nitriding method which utilizes a self-burning method (Self-Propagating High Temperature Synthesis, SHS method, hereinafter also burn synthesis method).

The self-burning method is also called burn synthesis method, and is a synthesis method in which a starting powder containing a silicon powder is introduced into a reaction vessel where part of the starting powder is ignited in a nitrogen atmosphere to carry out the nitriding reaction, and the heat of burning due to the nitriding reaction is propagated to the surrounding to react the whole starting powder.

The burn synthesis method requires no external heating means except the ignition device for starting the reaction, and can hence be simply fabricated also contributing to reducing the amount of energy that needs be thrown in. Moreover, the reaction itself is an exothermic reaction like the direct nitriding method, and the reaction temperature tends to become high. Accordingly, the silicon nitride is formed being melt-adhered together, and is obtained in the form of a mass.

The silicon nitride obtained in the form of a mass must be subjected to the pulverization or decomposition. According to the burn synthesis method as described above, the reaction proceeds sharply and the reaction temperature tends to become high. Therefore, there has also been employed a method which uses the silicon nitride powder as a diluting agent to mildly carry out the burning reaction.

(Starting Powder)

There is no specific limitation on the mean particle diameter of the silicon powder that is used as the starting powder in the direct nitriding method. It is, however, desired that the silicon powder has a mean grain size D50 of 1 to 10 μm. It is, further, desired that the silicon powder contains Al and Fe in amounts of 200 ppm or less, respectively.

It is desired that the silicon powder has its surfaces oxidized to a suitable degree. This is because an oxide film formed on the surfaces of the silicon powder serves as an important factor for property controlling the progress of the burn synthesis reaction. A method of suitably oxidizing the surfaces in its simple form would be to pulverize the silicon powder in the air so that the particle diameter thereof lies within the range mentioned above. For instance, there can be favorably employed a jet mill using air or the like method. The degree of oxidation of the silicon powder should be suitably determined to lie in a range in which the burn synthesis reaction of the invention is not impaired. For this, it is desired to contain oxygen in an amount of about 0.1 to 1% by mass relative to the weight of the silicon powder.

The starting powder may contain a diluent. The reaction of the silicon powder with the nitrogen is an exothermic reaction, and the surface reaction is a rate determining reaction. As the amount of the silicon powder increases, therefore, it becomes difficult to control the temperature of the starting powder. As the starting powder contains the diluent, however, the content of the silicon powder in the starting powder decreases and the starting powder generates the heat less. This makes it easy to control the temperature of the starting powder.

After the silicon nitride is formed by the reaction of the silicon powder, the diluent contained in the starting powder must be removed from the silicon nitride that is formed. To eliminate the necessity for this removal, it is recommended that the diluent is a nitride powder of the silicon element which is the same as the silicon powder. In the case of, for example, the silicon powder, it is desired that the diluent contained in the starting powder is the silicon nitride.

When the diluent is to be contained in the starting powder, the content of the diluent should be, for example, about 5 to about 80% relative to the whole amount of the starting powder.

(Reaction)

The starting powder is filled in a reaction vessel (setter). It is desired that the reaction vessel is made of ceramics, graphite or the like, and has resistance against the heat. The starting powder layer in the reaction vessel should have a bulk density that is set to lie in a range of 0.3 to 1.0 g/cm³. Upon being adjusted so as to assume the above bulk density, the starting powder layer is ignited to undergo the burn reaction suppressing the resultants of the unreacted product and enabling the whole starting powder to undergo the reaction. The bulk density of the starting powder layer can be adjusted relying on the mean particle diameter of the starting powder and the pressure of nitrogen that is fed for substituted with nitrogen.

In carrying out the burn synthesis method, furthermore, an igniting agent containing a powder of Ti, Al or the like may be added to a portion that becomes the igniting point. The amount of the igniting agent should be so small as will not affect the sintering of the obtained silicon nitride as a matter of course. The igniting agent can be arranged at an end part, at a central part, or at any part of the starting powder layer, either at a single place or at plural places.

After the reaction vessel is filled with the starting powder as described above, the interior of the reaction vessel is substituted with nitrogen, and the starting powder is ignited in a nitrogen atmosphere.

The reaction vessel is placed in a pressure-resistant closed reactor equipped with an igniting device and a gas feed/exhaust mechanism. Usually, the pressure in the reactor is reduced to remove the air and, thereafter, a nitrogen gas is fed to be substituted with nitrogen.

The reaction can be carried out under normal pressure or elevated pressure but, preferably, under elevated pressure. Specifically, when it is attempted to obtain a silicon nitride as the silicon nitride, the reaction should be carried out, preferably, under elevated pressure from the standpoint of easily carrying out the nitriding reaction. Concretely, the reaction should be carried out under normal pressure to a pressure of 1 MPa. The pressure can be attained relying on the pressure of nitrogen fed into the closed reactor.

When the pressure in the closed reactor is lower than the above-mentioned range, misfire may occur during the reaction and the amount of the unreacted product may increase and hence the yield may decrease. When the pressure in the closed reactor is larger than the above-mentioned range, on the other hand, the reaction temperature may rise excessively forming coarse masses of silicon. Therefore, the finally obtained silicon nitride powder may much contain coarse grains that are difficult to pulverize and it tends to become difficult to secure suitable particle size distribution.

The starting powder filled in the reaction vessel is ignited and the silicon powder is, desirably, directly reacted by the self-burning diffusion in a state of being pressurized with nitrogen, i.e., in a nitrogen atmosphere of 100 kPaG to 1 MPaG.

The ignition can be accomplished by a customary method, such as ignition by an arc discharge using a pair of electrodes attached to the closed reactor, ignition by heating by flowing an electric current to a heater made of carbon or silicon, or ignition by laser beam irradiation.

As the direct nitriding method, there can be concretely exemplified a method in which a metal silicon powder containing an aluminum element and an iron element in amounts of 0.05% by mass or less, respectively, or this metal nitride powder to which a silicon nitride powder for reaction control is added as required, is subjected to the direct nitriding method in a nitrogen atmosphere to obtain aggregated masses of the silicon nitride.

<Preliminary Pulverization>

When aggregated masses of the silicon nitride are firmly aggregated together like the silicon nitride obtained by the above-mentioned direct nitriding method, it is desired to preliminarily pulverize the silicon nitride into a coarse particle thereof having particle diameters that can be finely pulverized on an industrial scale prior to carrying out the dry pulverization. Through the preliminary pulverization, the silicon nitride should turn into the coarse particle of a mean particle diameter of 100 to 10,000 μm and, specifically, 100 to 5,000 µm. The preliminary pulverization can be carried out relying on a known pulverizing method by using a coarsely pulverizing machine such as jaw crusher or roll crusher to obtain the silicon nitride in a coarse particle form.

Furthermore, it is desired that the oxygen concentration of the silicon nitride before being preliminarily pulverized is as low as possible so that the oxygen concentration of the silicon nitride powder for sintering obtained through the dry pulverization will lie within the above-mentioned preferable range, and that the oxygen concentration be suitably adjusted under the condition of producing the silicon nitride. Moreover, the aggregated masses of the silicon nitride should have a purity that is so high as to be capable of obtaining the above-mentioned silicon nitride powder for sintering, and should contain the aluminum element in an amount of 0.1% by mass or less. In addition to the content of the aluminum element, the content of the iron element should be 0.1% by mass or less and the contents of the high-melting metal elements such as tungsten and molybdenum should also be 0.1% by mass or less, respectively. The silicon nitride powder having such a high purity is obtained by a method described below. Namely, by using a silicon powder of a high purity containing heavy metals at low concentrations, there are obtained aggregated masses of the silicon nitride of a high purity by the direct nitriding method. Preferably, furthermore, the aggregated masses thereof are roughly pulverized by using a pulverizing machine coated with the silicon nitride sintered body which is the same material as the silicon nitride of the high purity.

<Dry Pulverization>

The dry pulverization pulverizes the aggregated masses of the silicon nitride in an inert atmosphere in the presence of a silane coupling agent. To prevent the oxidation during the dry pulverization, the atmosphere is rendered inert. Concretely, the pulverization is carried out in an inert gas atmosphere such as of nitrogen, argon or the like.

As the silane coupling agent, there can be used any known compound without any specific limitation. Concretely, there can be exemplified for silane coupling agents such as hexamethyldisilazane (HMDS), and dimethyldimethoxysilane. Of them, hexamethyldisilazane is particularly effective and is preferably used in the present invention. The silane coupling agent should be used for the dry pulverization in such an amount that the hydrophobicity (M value) which represents the hydrophobicity of the obtained silicon nitride powder for sintering is 30 or more and, specifically, 40 or more. Usually, the silane coupling agent is used in an amount of 0.5 to 10 parts by mass and, preferably, 0.5 to 5 parts by mass per 100 parts by mass of the aggregated masses of the silicon nitride.

Further, the dry pulverization is so carried out that the pulverized product will have a specific surface area of 5 to 30 $m^2/g$ and, preferably, 8 to 15 $m^2/g$ from the standpoint of obtaining a desired fine silicon nitride powder for sintering.

In the invention, the dry pulverization is carried out in the presence of the silane coupling agent after, as required, the aggregated masses of the silicon nitride have been preliminarily pulverized. From the standpoint of pulverization efficiency, the pulverization is, preferably, carried out by using a ball mill which applies a large shearing force during the pulverization. As the ball mill, there can be exemplified a static ball mill, a vibration ball mill, a beads mill, etc. Here, the balls for pulverization are, preferably, the balls made of the silicon nitride sintered body which is the same material as the silicon nitride, and their sizes are suitably determined depending on the kind of the ball mills. As required, the pulverization will be carried out by also using a pulverizing assistant which may be an alcohol such as ethanol or isopropyl alcohol, or water.

[Method of Producing the Silicon Nitride Sintered Body]

The sintered body can be produced by sintering the starting silicon nitride powder. The sintering is, desirably, carried out in the presence of a sintering assistant. The starting silicon nitride powder is desirably sintered as a formed body. The formed body is, desirably, formed by using a forming assistant and a binder.

(Starting Silicon Nitride Powder)

In carrying out the method of producing a silicon nitride sintered body by using the silicon nitride powder for sintering of the present invention, it is allowable to use, as the starting silicon nitride powder, 100% of the silicon nitride powder for sintering of the present invention. In order to further improve the sintering property, however, the silicon nitride powder for sintering of the invention may be used being mixed with a silicon nitride powder having a larger particle diameter.

To carry out the sintering, furthermore, a mixed starting material is, first, obtained by blending the silicon nitride powder for sintering with a sintering assistant and is then formed into any shape to obtain a formed body thereof. The formed body is, thereafter, fired in a nitrogen atmosphere.

(Sintering Assistant)

As the sintering assistant used for preparing the starting mixture, there can be used, without any specific limitation, any sintering assistant that has been known as the sintering assistant for the silicon nitride. For example, the sintering assistant, usually, comprises chiefly yttria. However, a sintering assistant that also uses alumina or zirconia in addition to yttria makes it possible to obtain a densely sintered body even at a temperature of as low as 1700° C. and in an inert atmosphere of atmospheric pressure. When the silicon nitride sintered body is required to have a high heat conductivity, a combination of yttria and magnesia is favorably used as the sintering assistant. In this case, the magnesia sintering assistant exhibits its effects at high temperatures. Therefore, the sintering temperature that will be described later is better 1850° C. or higher, and the sintering is better carried out in an elevated pressure atmosphere of nitrogen.

It is also allowable to use a metal compound such as of yttria described above and a metal-silicon carbonitride type compound or, concretely, a compound represented by the composition formula $M_2Si_4N_6C$ (M is Hf, Mg, Sr, Zr, Sc, Y or lanthanoid element). Upon using the above metal-silicon carbonitride type compound and also a metal oxide type compound that will be described later, a further increased density is imparted by the silicon nitride sintered body that is obtained and a further increased heat conductivity is also exhibited. That is, the metal-silicon carbonitride type compound exhibits a high reducing action due to C (carbon) making it, therefore, easy to obtain a silicon nitride sintered body featuring a low oxygen concentration and a high heat conductivity.

(Formed Body)

There is no specific limitation on the method of producing a formed body of the starting mixture. It is, however, desired that the starting mixture is formed into any shape such as sheet, spherical shape or rectangular shape by using, as a forming assistant, the water or an organic solvent such as ethanol or the like, and then the formed body is subjected to the sintering. To maintain the strength of the formed body, it is also allowable to use a known organic binder during the forming. Here, it is desired to remove the forming assistant and the organic binder prior to carrying out the sintering.

(Density of the Formed Body)

Though there is no specific limitation, the formed body has a density which is, preferably, 1.95 g/cm³ or more and, more preferably, 1.98 g/cm³ or more. When the formed body has a density which is not lower than these lower limit values, the silicon nitride sintered body can be easily obtained having excellent heat conductivity.

(Preparation of the Formed Body)

As a method of preparing a formed body, concretely speaking, the above-mentioned starting mixture is added with the water or an organic solvent as the forming assistant, and the mixture thereof is formed into a formed body relying on a known forming means. As the forming assistant, the water is preferably used. Addition of the water helps improve handling and easiness of forming. Moreover, use of the water is desired from the standpoint of reducing load on the environment as compared to using organic solvents.

From the standpoint of improving the formability, furthermore, the starting mixture may be blended with a binder. The content of the binder in the starting mixture is, preferably, 1 to 30 parts by mass per 100 parts by mass of the silicon nitride powder, and its ratio may be suitably determined depending on the forming method.

As the binder, though not specifically limited, there can be exemplified polyvinyl alcohol, polyvinyl butyral, methyl cellulose, alginic acid, polyethylene glycol, carboxymethyl cellulose, ethyl cellulose and acrylic resin.

As the known forming method, there can be exemplified press forming method, extrusion forming method, injection forming method, sheet forming method (doctor blade method) and the like method.

After the forming by the above-mentioned know forming means, it is desired to provide a step of heating at 450 to 650° C. in the air or in an inert atmosphere of nitrogen or argon. This step works to remove the water that is used and the binder (dewaxing).

(Sintering)

The starting mixture may be directly sintered but is, desirably, sintered after having prepared a formed body thereof using the water as the forming assistant.

The sintering is, desirably, carried out in an inert gas atmosphere. The inert gas atmosphere stands for, for example, a nitrogen atmosphere or an argon atmosphere.

In the inert gas atmosphere, the sintering can also be carried out by employing a gas pressure sintering method (GPS method) as a method of sintering the silicon nitride. Therefore, employment of normal pressure sintering method, that is, the sintering method which can be carried out under normal pressure or under nearly normal pressure also makes one of the features of the present invention. Namely, according to the present invention, the sintering is, desirably, carried out under a pressure of 0 MPa·G or more but 0.92 MPa·G or less. Here, G at the end of pressure unit MPa·G stands for the gauge pressure.

The sintering can be carried out in a batch furnace such as muffle furnace or tubular furnace, or can also be carried out in a continuous furnace such as pusher furnace if low pressure conditions are selected.

The formed body is, desirably, calcined by being heated at a temperature of 1200 to 1900° C. When the temperature is 1200° C. or higher, the silicon nitride sinters more easily and when the temperature is 1900° C. or lower, the silicon nitride decomposes difficultly. From such a point of view, it is desired that the temperature of heating at the time of calcining is 1600 to 1900° C.

Further, though not specifically limited, the calcining time is desirably, about 3 to about 24 hours.

(Properties of the Silicon Nitride Sintered Body)

The silicon nitride sintered body obtained by using the silicon nitride powder for sintering of the present invention shows a high heat conductivity. The heat conductivity of the obtained silicon nitride sintered body should, desirably, be 80 W/mK or more and, more desirably, 100 W/mK or more.

The heat conductivity can be measured by a laser flash method.

The silicon nitride sintered body obtained by the production method of the present invention features a high density. Therefore, the silicon nitride sintered body that is obtained has a relative density of, desirably, 98.5% or higher and, more desirably, 99% or higher. Here, the relative density is calculated according to the following formula.

$$\text{Relative density (\%)}=100\times\text{measured density/theoretical density}$$

The measured density is a density measured by the Archimedes' method.

EXAMPLES

The invention will now be described more concretely by means of Examples to which only, however, the invention is in no way limited. In Examples, properties were measured by the methods described below.

(1) Specific surface area of the silicon nitride powder was measured by the BET one-point method based on the nitrogen gas adsorption.

(2) Particle diameter of the silicon nitride powder.

(Pretreatment of Samples)

As a pretreatment, the silicon nitride powder which is the sample was fired in the air at a temperature of about 500° C. for 2 hours. Through the sintering in the air at the temperature of about 500° C. for several hours, the sample as the silicon nitride powder exhibited hydrophilic property and easily dispersed in an aqueous solvent enabling the grain sizes to become measurable maintaining a high reproducibility. Here, it has been confirmed that the particle diameter was not almost affected even if the silicon nitride powder was fired in the air.

(Measuring the Particle Diameter)

Into a beaker (inner diameter of 60 mmφ, a height of 70 mm) having an indicator of a maximum of 100 ml, there were introduced 90 ml of water and 5 ml of a sodium pyrophosphate of a concentration of 5% by mass with good stirring. Thereafter, roughly a loopful of the sample as the silicon nitride powder was thrown in and was dispersed therein by an ultrasonic homogenizer (US-300E, tip diameter of 26 mm, manufactured by Nihon SeikiMfg., Co.) with an amplitude of 50% (about 2 amperes) for 2 minutes.

The dispersion was executed by inserting a top of the tip in the beaker down to a position of an indication of 20 ml.

Next, by using a laser diffraction-light scattering particle size distribution measuring apparatus (Microtrack MT3300 EXII, manufactured by Microtrack BEL Corp.), a dispersion solution of the obtained silicon nitride powder was measured for its particle size distribution. The measuring conditions consisted of selecting the water (refractivity of 1.33) as the solvent, a refractivity of 2.01 as the particle property, permeation as the particle permeability, and non-spherical shape as the particle shape.

The particle diameter with which a cumulative curve of the particle size distribution becomes 50% as measured by the above particle size distribution measurement was regarded to be a mean particle diameter.

(3) Hydrophobicity (M Value)

The hydrophobicity was measured by the methanol titration method. That is, 50 ml of the ion-exchanged water and 0.2 g of the sample were introduced into a beaker, and methanol was titrated from a burette with stirring by using a magnetic stirrer. The powder gradually settled as the methanol concentration increased in the beaker. At a moment when the powder has all settled, the methanol mass component in the methanol-water mixed solution was regarded to be a hydrophobicity (%).

(4) Oxygen Concentration in the Silicon Nitride Powder

A powder sample was put into a nickel capsule, and the oxygen concentration in the silicon nitride powder was measured by using an oxygen/nitrogen analyzer (trade name: EMGA-920, manufactured by Horiba Mfg. Co.) based upon an inert gas fusion non-dispersive infrared absorption method.

(5) β Conversion Ratio

The β conversion ratio was determined relying on the RIR (Reference Intensity Ratio) method which uses an intensity ratio of a diffraction line of the α type silicon nitride obtained from an X-ray diffraction (XRD) and a diffraction line of the β type silicon nitride. The RIR value may slightly differ depending on the data base that is used and on the number that is selected. Therefore, the measurement in this case has employed 0.87 which was an RIR value of a PDF card No. 01-076-1407 for the α type silicon nitride and 1.26 which was an RIR value of a PDF card No. 01-083-0701 for the β type silicon nitride. Namely, a mixing ratio of the α type and the β type was measured, and the β conversion ratio was calculated as β conversion=β type ratio/(α type ratio+β type ratio).

(6) Contents of Aluminum Element and Iron Element

Impurity concentrations in the silicon nitride powder were measured relying on the method specified under the JIS R 1603:2007.

Example 1

By using an airflow pulverizing machine (jet mill) lined with the silicon nitride, polycrystalline silicon of a high purity of a class of the solar cell use was pulverized down to a mean particle diameter of about 5 to about 10 μm. The pulverized silicon was directly nitrided in a nitrogen atmosphere to obtain aggregated masses of the silicon nitride.

The aggregated masses of the silicon nitride were coarsely pulverized by using a vibration mill pulverizer of which the pulverizing fittings have been coated with an urethane to obtain aggregated masses of the silicon nitride having a mean particle diameter of about 250 μm. Next, to 100 parts by mass of the aggregated masses of the silicon nitride, there were added 1 part by mass of HMDS and 0.5 parts by mass of ethanol as a pulverizing assistant. Thereafter, by using a beads mill made of a silicon nitride material that would not cause contamination with heavy metals, the mixture was dry pulverized to produce a silicon nitride powder for sintering.

The thus obtained silicon nitride powder for sintering was measured for its specific surface area, mean particle diameter, hydrophobicity (M value), β conversion ratio, oxygen concentrations before and after left to stand in the air of a humidity of 90% and 20° C. for 48 hours (also called "humidification treatment") and an increase in the oxygen concentration. The results were as shown in Table 1.

Examples 2 and 3

Silicon nitride powders for sintering were produced by the same method as that of producing the silicon nitride powder of Example 1 but changing the amount of addition of the silane coupling agent and adjusting the time for pulverization by the beads mill such that the specific surface areas were as shown in Table 1.

The obtained silicon nitride powders for sintering were measured for their mean particle diameters, hydrophobicities (M values), β conversion ratios, oxygen concentrations before and after the humidification treatment and increases in the oxygen concentration. The results were as shown in Table 1.

Examples 4 and 5

Silicon nitride powders for sintering were produced by the same method as that of producing the silicon nitride powder of Example 1 but changing the amount of addition of the silane coupling agent to adjust the M values as shown in Table 1.

The obtained silicon nitride powders for sintering were measured for their mean particle diameters, hydrophobicities (M values), β conversion ratios, oxygen concentrations before and after the humidification treatment and increases in the oxygen concentration. The results were as shown in Table 1.

Comparative Example 1

A silicon nitride powder for sintering was produced by the same method as that of producing the silicon nitride powder for sintering of Example 2 but using no silane coupling agent while adding 1.5 parts by mass of ethanol as a pulverizing assistant and followed by the same fine pulverization.

The obtained silicon nitride powder for sintering was measured for its specific surface area, mean particle diameter, hydrophobicity (M value), β conversion ratio, oxygen concentrations before and after the humidification treatment and an increase in the oxygen concentration. The results were as shown in Table 1.

Comparative Example 2

A silicon nitride powder for sintering was obtained in the same manner as in Comparative Example 1 but, after having been finely pulverized by the beads mill, adding the HMDS as the silane coupling agent so that the M value was the same as that of Example 2 and executing the stirring by using a stainless steel pot mixer for 2 hours.

The obtained silicon nitride powder for sintering was measured for its specific surface area, mean particle diameter, hydrophobicity (M value), β conversion ratio, oxygen concentrations before and after the humidification treatment and an increase in the oxygen concentration. The results were as shown in Table 1.

[Production of Sintered Bodies]

In Examples and Comparative Examples, 100 parts by mass of the silicon nitride powder for sintering after having been humidification treated, 4 parts by mass of an yttria powder as a sintering assistant, and 2 parts by mass of a MgO powder were weighed and to which the water was mixed as a dispersion medium to thereby prepare a slurry thereof. Here, the water had been so weighed in advance that the concentration of the slurry was 60% by weight. After the mixing, a binder was added in an amount of 22 parts by mass, further, followed by mixing for 12 hours to obtain a slurry composition for forming. Next, by using a vacuum defoaming machine (manufactured by Sayama Riken Co.), the composition for forming was adjusted for its viscosity to thereby prepare a slurry for coating. Thereafter, the composition for forming of which the viscosity has been adjusted was formed into a sheet by a doctor blade method. There was thus obtained a green sheet having 30 cm wide and 0.42 mm thick. Table 2 shows the properties of the green sheets that were obtained.

The thus obtained green sheet was placed in a sintering container while using a boron nitride powder as a parting material, and was dewaxed in the dry air at a temperature of 550° C. to obtain a sheet-like dewaxed body.

Next, the dewaxed body was put into a sintering furnace and was fired at 1780° C. for 9 hours in a nitrogen atmosphere under a pressure of 0.02 MPa·G to obtain a silicon nitride sintered body.

Table 1 shows a relative density and a heat conductivity of the obtained silicon nitride sintered body. As described above, it was confirmed that the silicon nitride powders for sintering of the Examples could be used for the sintering applications without any problems.

TABLE 1

| | Example 1 | Example 2 | Example 3 | Example 4 | Example 5 | Comparative Example 1 | Comparative Example 2 |
|---|---|---|---|---|---|---|---|
| Specific surface area ($m^2/g$) | 10.1 | 14.2 | 25.0 | 11.0 | 11.6 | 15.6 | 15.5 |
| Mean particle diameter ($\mu m$) | 1.13 | 0.89 | 0.70 | 1.01 | 0.97 | 0.79 | 0.79 |
| M value | 38 | 45 | 52 | 48 | 54 | 0 | 45 |
| $\beta$ conversion ratio (%) | 90 | 90 | 90 | 90 | 90 | 90 | 90 |
| Oxygen concentration before humidification (% by mass) | 0.50 | 0.74 | 1.76 | 0.50 | 0.50 | 1.01 | 0.99 |
| Oxygen concentration $C_0$* (% by mass) | 0.63 | 0.90 | 1.98 | 0.58 | 0.54 | 1.53 | 1.34 |
| Increase in oxygen concentration (% by mass) | 0.13 | 0.16 | 0.22 | 0.08 | 0.04 | 0.52 | 0.35 |
| Rate of increase in oxygen concentration (%) | 26 | 22 | 13 | 16 | 8 | 51 | 35 |
| Relative density of sintered body (%) | 99≤ | 99≤ | 99≤ | 99≤ | 99≤ | 97 | 98 |
| Heat conductivity (W/m · K) | 101 | 98 | 95 | 102 | 105 | 74 | 76 |

*Oxygen concentration after left to stand in the air of a humidity of 90% and 20° C. for 48 hours.

The invention claimed is:

1. A silicon nitride powder for sintering having a specific surface area of 5 to 30 $m^2/g$, and by having a hydrophobicity (M value) of 30 or more and an increase in the oxygen concentration of 0.30% by mass or less after left to stand in the air of a humidity of 90% and 20° C. for 48 hours.

2. The silicon nitride powder for sintering according to claim 1, wherein the oxygen concentration (Co % by mass) after left to stand in the air of a humidity of 90% and 20° C. for 48 hours lies in a range represented by the following formula (1), $$Co ≤ 0.1 × S − 0.3 \qquad (1)$$

for said specific surface area ($Sm^2/g$).

3. A silicon nitride powder for sintering having a specific surface area of 5 to 30 $m^2/g$, and having a hydrophobicity (M value) of 30 or more and an increase in the oxygen concentration of 0.30% by mass or less after left to stand in the air of a humidity of 90% and 20° C. for 48 hours, wherein a $\beta$ conversion ratio is 80% or more and an aluminum concentration is 0.1% by mass or less.

4. A silicon nitride powder for sintering having a specific surface area of 5 to 30 $m^2/g$, and having a hydrophobicity (M value) of 30 or more and an increase in the oxygen concentration of 0.30% by mass or less after left to stand in the air of a humidity of 90% and 20° C. for 48 hours, wherein the oxygen concentration (Co % by mass) after left to stand in the air of a humidity of 90% and 20° C. for 48 hours lies in a range represented by the following formula (1), $$Co ≤ 0.1 × S − 0.3 \qquad (1)$$

for said specific surface area ($Sm^2/g$), wherein a $\beta$ conversion ratio is 80% or more and an aluminum concentration is 0.1% by mass or less.

* * * * *